United States Patent [19]

Yamamoto

[11] Patent Number: 4,775,267
[45] Date of Patent: Oct. 4, 1988

[54] PNEUMATIC CONVEYOR FOR POWDER

[75] Inventor: Takashi Yamamoto, Chiba, Japan

[73] Assignee: Nisso Engineering Co., Ltd., Chiyoda, Japan

[21] Appl. No.: 13,604

[22] Filed: Feb. 12, 1987

[51] Int. Cl.⁴ .............................................. B65G 53/66
[52] U.S. Cl. ........................................ 406/50; 406/12; 406/85; 406/93
[58] Field of Search .............. 406/50, 85, 12, 93, 406/94, 95; 222/630; 137/154; 291/3, 11 R

[56] References Cited

U.S. PATENT DOCUMENTS

| | | | |
|---|---|---|---|
| 3,604,758 | 9/1971 | Flain ...................................... | 406/50 |
| 3,858,943 | 1/1975 | Bose et al. ............................ | 406/50 |
| 3,861,830 | 1/1975 | Johnson ............................. | 406/85 X |
| 3,955,853 | 5/1976 | Rusterholz ........................... | 406/50 |
| 4,286,935 | 9/1981 | Okuno et al. ..................... | 406/50 X |
| 4,420,279 | 12/1983 | Easley, Jr. ......................... | 406/50 X |

FOREIGN PATENT DOCUMENTS 21690  6/1980  Japan .
33422  2/1986  Japan .

*Primary Examiner*—Galen Barefoot
*Assistant Examiner*—Paul E. Salmon
*Attorney, Agent, or Firm*—Felfe & Lynch

[57] ABSTRACT

Disclosed is a pneumatic conveyor system for powder. The conveyor system includes a powder feeder, a bent pipe, a transport pipe, a first air supply nozzle connected to an upper pipe member of the bent pipe, and a second air supply nozzle connected to a curved pipe member of the bent pipe oppositely to the lower end opening of a converging pipe portion of the curved pipe member. Alternate supply of air from the first and second air supply nozzles to the bent pipe is effected intermittently at a predetermined interval of time, so that the power is compacted and formed into a lump of clean powder plug.

7 Claims, 1 Drawing Sheet

PNEUMATIC CONVEYOR FOR POWDER

BACKGROUND OF THE INVENTION

1. Field of the Invention

The present invention is in a pneumatic conveyor for transporting powder by using air especially high-pressure air.

2. Description of the Prior Art

A batch plug conveyor is known as a high-pressure pneumatic conveyor and typically needs a large pressure tank adapted to charge powder. In a typical, exemplary configuration, a conveyor has at least upper and lower tanks connected in series. Discharge valves connected to these tanks are operated in order that powder charged in the upper tank is supplied to the lower tank and the powder within the lower tank is pressurized so as to be transported successively. In an apparatus having such pressure tanks, valves such as butterfly valves and/or ball valves are used, thus complicating the operation. The valves are used for actuation in ambient powder and so tend to be worn away be the powder, causing leakage of air. In addition, apparatus equipped with large pressure tanks have increased height and disadvantageously require a large installation space together with increased cost.

SUMMARY OF THE INVENTION

An object of this invention is to obviate the drawbacks of the prior art apparatus and to provide a simplified and highly operational pneumatic conveyor for powder which can dispense with the pressure tanks.

SUMMARY OF THE INVENTION

According to the invention, to accomplish the above object, a pneumatic conveyor for powder is provided comprising: an airtight feeder for powder; a bent conduit comprised of an upper vertical conduit member connected to the powder feeder and having an opening in communication with a bottom outlet port of the powder feeder, an intermediate curved conduit member and a lower horizontal conduit member the diameter of which gradually decreases toward the lower end of the bent conduit to form a converging conduit portion; a transport conduit section connected to the lower horizontal conduit member of the bent conduit to communicate with the lower end opening of the converging portion and having a diameter which is substantially equal to that of the lower end opening. The invention also includes a first air supply nozzle connected for opening, to the upper pipe conduit; and a second air supply nozzle connected for opening, to the curved conduit member oppositely to the lower and opening of the converging portion of the bent conduit. Also included is a system for the alternate supply of air from the first and second air supply nozzles to the bent conduit effected intermittently at a predetermined interval of time. With the above construction, the powder is initially compacted by air from the first air supply nozzle before being compacted by air from the second air supply nozzle. The mass is then formed into a densely compacted lump by the converging pipe portion of the bent pipe and finally formed into a clean plug of powder by being pushed out of the converging portion into the transport member under the application of air pressure from the second air supply nozzle. This construction is simple because it does not require conventional pressure tanks, can minimize the number of valves used thereby eliminating the trend of air leakage caused by the abrasion of the valves, is highly operational and requires a relatively small installation space.

Another object of the invention is to provide a pneumatic conveyor for powder which can permit air from the first air supply nozzle to be uniformly drawn into the bent pipe in order that powder piled up in the bent conduit can be compacted without being disturbed.

To accomplish that object, according to an embodiment of the invention, the upper conduit member to which the first air supply nozzle is connected for opening includes a short pipe, and an air-permeable porous ring is arranged within the short pipe to form an annular gap between the outer circumferential surface of the ring and the inner circumferential surface of the short pipe.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

DESCRIPTION OF THE PREFERRED EMBODIMENTS

Figure 1:
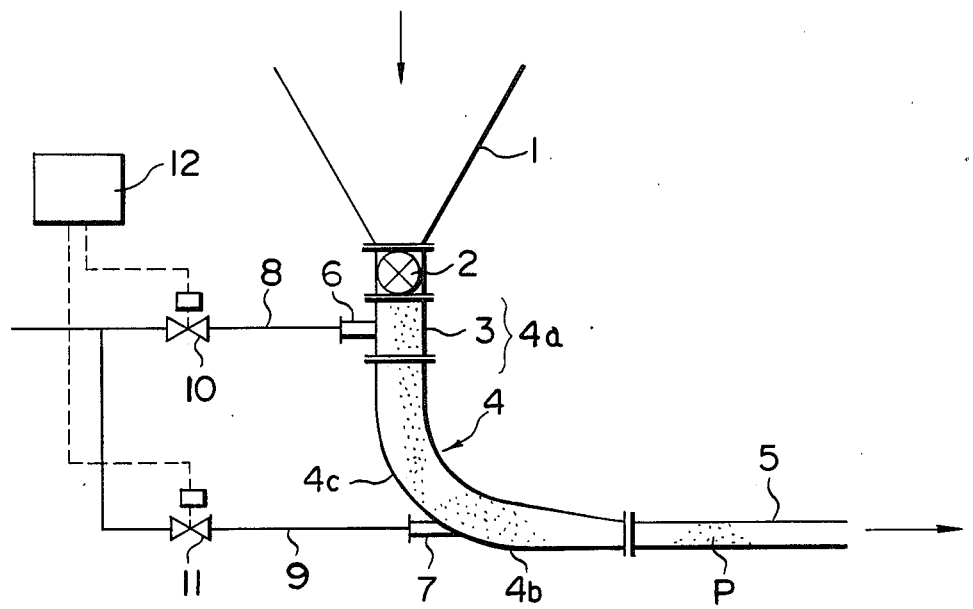
FIG. 1 is a schematic front elevation view illustrating a pneumatic conveyor for powder according to an embodiment of the invention.

Referring now to FIG. 1, a hopper 1 has, at its bottom, an outlet port to which a powder feeder 2, a short pipe 3 forming part of a bent pipe 4 and the bent pipe 4 are successively connected downwards. A horizontal transport pipe 5 is connected to the bent pipe 4. For example the feeder 2 is a relatively highly airtight rotary valve (airlock) of, for example, about 0.3 to 0.5 Kg/cm$^2$ pressure-proof capability. An upper air supply nozzle 6 is connected to the short pipe 3 and opens laterally thereof. The bent pipe 4 is comprised of an upper vertical pipe member 4a inclusive of the short pipe 3, a lower horizontal pipe member 4b and an intermediate 90° curved pipe member 4c between pipe members 4a and 4b. The horizontal pipe member 4b has a top which gradually tapers downward toward both the horizontal bottom and the lower end of the bent pipe to form a downwardly slanting, tapered, converging pipe portion having a lower end opening of substantially the same diameter as that of the transport pipe 5. A lower air supply nozzle 7 is connected, oppositely to the lower end opening, to the curved pipe member 4c of bent pipe 4 to open laterally thereof so that the transport pipe 5 can be viewed from the opening of the nozzle 7 through the lower end opening.

A single air pipe connected to air supply source branches to air pipes 8 and 9 which are respectively associated with solenoid valves 10 and 11 and terminate in connections to nozzles 6 and 7, respectively. The solenoid valves 10 and 11 are electrically connected to a controller 12 through electrical wirings (dotted line).

The controller 12 incorporates a control circuit adapted to control the solenoid valves 10 and 11 such that their simultaneous operations are effected intermittently at a predetermined interval of time (for example, 0.5 to 2 seconds) for their alternate opening and closing.

The operation of the foregoing embodiment will now be described.

Powder is stored in a hopper 1 and is successively dropped, by a constant amount, so as to be discharged into the short pipe 3 and bent pipe 4 through the feeder 2. Initially, when under this condition, the solenoid valve 10 is operated to open and the solenoid valve 11 is concurrently operated to close. Powder within the short pipe 3 is deflected oppositely to the nozzle 6 by air pressure from the nozzle 6 so as to be compacted and accumulated in the curved pipe member 4c and near the horizontal pipe member 4b of the bent pipe 4. The piled-up powder is further compacted for coalescence by air pressure continuously supplied from the nozzle 6 so as to be pushed into the converging pipe portion of horizontal pipe member 4b whereat the powder undergo strong compaction and is formed into a densely compacted lump of powder (primary compaction). During the above procedure, air from the nozzle 6 will not flow back into the hopper 1 due to the airtight capability of the feeder 2 but will flow totally to the bent pipe 4 through the short pipe 3, participating in compacting the powder.

After expiration of the predetermined interval of time, the solenoid valve 10 is closed and the solenoid valve 11 is concurrently opened. Thus the lump of powder is compacted by air pressure from the nozzle 7 (secondary compaction) and pushed out of the converging pipe portion into the transport pipe 5, thereby generating one plug designated at P in FIG. 1. Subsequently, the solenoid valve 10 is opened concurrently with closure of the solenoid valve 11 to repeat the above procedure, thus completing one cycle. Intermittent supply of powder from the feeder 2 is continuously controlled independently of the predetermined interval of time for the solenoid valves 10 and 11.

Figure 2:
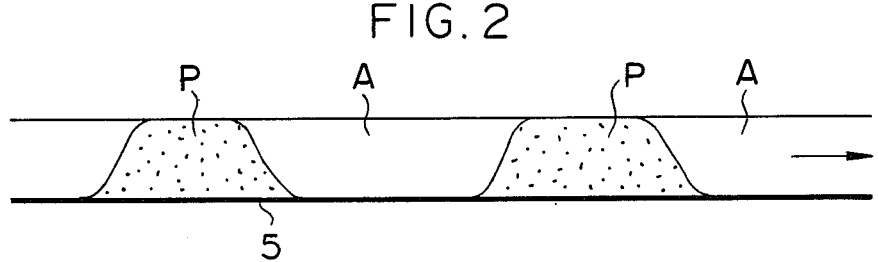
FIG. 2 is a diagram useful in explaining transportation of powder plugs.

In this manner, the powder supplied from the feeder 2 is formed into a highly dense plug of a large solid/gas ratio, which is conveyed within the transport pipe 5 and followed by a subsequent plug. It will therefore be appreciated from FIG. 2 that fully non-blow-by, clean plugs P of powder spaced apart by an air plug A are sequentially transported.

The level of air pressure supplied from the nozzles 6 and 7 is changed in accordance with such factors as properties of the powder and the length of the transport pipe 5, as in the case of the conventional pneumatic conveyor for powder. The operation of the apparatus may be adjusted as desired within a certain extent. For example, one cycle operation may be followed by the succeeding cycle operation after a slightly extended interval of time in order to prolong the length of powder plug P. In another instance, the time for completing the supply of air from the nozzle 7 may be slightly decreased in order to reduce the spacing between adjacent powder plugs P, thereby attaining high-density transportation. In further instance, the feeder 2 is operated for a slightly prolonged constant time, coming to temporary stoppage and air is supplied from the nozzle 6 and thereafter from the nozzle 7. This operation repeats itself to perform intermittent batch plug transportation.

Figure 3:
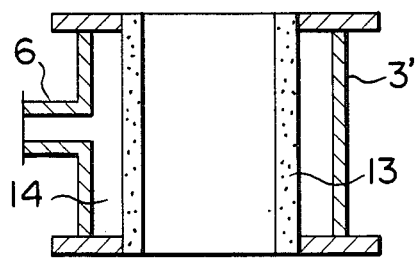
FIG. 3 is an enlarged sectional view illustrating another embodiment of short pipe.

FIG. 3 illustrates another embodiment of short pipe 3, wherein an air-permeable porous ring 13 is arranged within a short pipe 3' to form an annular gap 14 between the outer circumferential surface of the ring 13 and the inner circumferantial surface of the short pipe 3'. An upper air supply nozzle 6 is connected to the short pipe 3' to communicate with the annular gap 14 and to open laterally to the short pipe 3'.

With short pipe 3', air from nozzle 6 is once fed into the annular gap 14 and thereafter uniformly drawn into the bent pipe from the annular gap 14 through perforations distributed over the circumference of the ring 13.

By way of example, the present invention is practiced on the basis of design and dimensions specified below. Dried clay of 0.6 apparent specific gravity and having a particle distribution such that 65% is less than 40 microns in diameter is the powder. As the feeder 2, a rotary feeder of 0.4 Kg/cm$^2$ pressure-proof capability is used. The short pipe 3' has an inner diameter of 18 cm and a length of 15 cm and is incorporated with the porous ring 13 having perforations of 5 micron diameter and a thickness of 10 mm. The bent pipe 4 has an inner diameter of 18 cm and a length, inclusive of the converging pipe portion, of 60 cm. The converging pipe portion is tapered at a ratio of 1 (one) and has a lower end opening of 5 cm which equals the inner diameter of the transport pipe 5 having a horizontal length of 10 m. With this apparatus, alternate supply of 0.4 Kg/cm$^2$ pressurized air from the nozzles 6 and 7 is effected intermittently at an interval of one second to produce clean powder plugs P of a solid/gas weight ratio of 60 which are conveyed sequentially at a powder transport rate of 1140 Kg/h. The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A pneumatic conveyor for powder comprising:
   an airtight powder feeder having a discharge opening;
   conduit means having an upper vertical conduit connected to said airtight powder feeder and having an opening in communication with said discharge opening to receive powder therefrom, an intermediate curved conduit and a lower horizontal conduit section to receive powder from said upper vertical conduit, said lower horizontal conduit having a gradually decreasing diameter toward its discharge end to form a converging portion, said upper vertical conduit including a short section with an inner circumferential surface, and an air-permeable porous ring having an outer circumference arranged within said short section to form an annular gap between the outer circumferential surface of said ring and the inner circumferential surface of said short section;
   a transport section connected to said converging discharge end and having a diameter which is substantially equal to that of said discharge end;
   a first gas supply means opening into said upper conduit;
   a second gas supply means opening into said curved conduit oppositely to said discharge end; and
   means for alternately supplying gas to said first and second gas supply means.

2. The pneumatic conveyor of claim 1 wherein the conduit means is a pipe.

3. The pneumatic conveyor of claim 1 wherein the gas is air.

4. The pneumatic conveyor of claim 3 wherein the first gas supply means includes a first valve.

5. The pneumatic conveyor of claim 4 wherein the second gas supply means includes a second valve.

6. The pneumatic conveyor of claim 5 wherein at least the first valve is a solenoid valve.

7. The pneumatic conveyor of claim 1 wherein the alternating means includes a controller.

* * * * *